United States Patent
Green et al.

(10) Patent No.: US 7,292,620 B2
(45) Date of Patent: Nov. 6, 2007

(54) METHOD AND APPARATUS TO GENERATE A CLOCK-BASED TRANSMISSION

(75) Inventors: Evan Green, Beaverton, OR (US); Minnie Ho, Palo Alto, CA (US); Jeffrey Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 10/334,112

(22) Filed: Dec. 31, 2002

(65) Prior Publication Data
US 2004/0125859 A1 Jul. 1, 2004

(51) Int. Cl.
*H04B 1/00* (2006.01)
*H04L 27/00* (2006.01)

(52) U.S. Cl. ...................... 375/146; 375/295

(58) Field of Classification Search ............ 375/140, 375/141, 146, 130, 242, 295, 353, 373, 376, 375/377; 455/91
See application file for complete search history.

(56) References Cited

U.S. PATENT DOCUMENTS

| | | | | |
|---|---|---|---|---|
| 4,181,889 A | * | 1/1980 | Davis et al. | 455/108 |
| 4,577,335 A | * | 3/1986 | Wong et al. | 375/332 |
| 5,377,226 A | * | 12/1994 | Davis | 370/342 |
| 5,781,583 A | * | 7/1998 | Bruckert et al. | 375/146 |
| 5,793,794 A | * | 8/1998 | Kato et al. | 375/149 |
| 6,490,328 B1 | * | 12/2002 | Wu | 375/346 |
| 6,735,238 B1 | * | 5/2004 | McCorkle | 375/130 |
| 6,937,667 B1 | * | 8/2005 | Fullerton et al. | 375/295 |
| 6,952,456 B1 | * | 10/2005 | Aiello et al. | 375/295 |
| 2001/0021288 A1 | * | 9/2001 | Watanabe et al. | 385/15 |
| 2001/0033576 A1 | * | 10/2001 | Richards | 370/442 |
| 2002/0071509 A1 | | 6/2002 | Richards et al. | |
| 2002/0097790 A1 | | 7/2002 | Dress et al. | |
| 2003/0053555 A1 | * | 3/2003 | McCorkle et al. | 375/295 |
| 2004/0017840 A1 | * | 1/2004 | Siwiak | 375/146 |
| 2004/0047285 A1 | | 3/2004 | Foerster et al. | |
| 2004/0077306 A1 | * | 4/2004 | Shor et al. | 455/1 |
| 2004/0131130 A1 | * | 7/2004 | Shor et al. | 375/308 |

FOREIGN PATENT DOCUMENTS

| | | |
|---|---|---|
| WO | WO 01/93520 | 12/2001 |
| WO | WO 01/99305 | 12/2001 |
| WO | WO 2004/062128 A2 | 7/2004 |

OTHER PUBLICATIONS

PCT Search Report for Patent Application PCT/US03/41434, dated Oct. 22, 2004.
http:www.avtechpulse.com/papers/subnano/ As printed on Oct. 13, 2002.
http:/mv.chipcenter.com/eexpert/akruger/akruger059.html As printed on Oct. 13, 2002.
"Introduction to Ultra-wideband Radar Systems", James D. Taylor, ed., CRC Press, 1995, ISBN O-8493-4440-9; pp. 118-119, 140-143.

* cited by examiner

Primary Examiner—Mohammed Ghayour
Assistant Examiner—Vineeta Panwalkar
(74) Attorney, Agent, or Firm—Pearl Cohen Zedek Latzer, LLP (57) ABSTRACT

A method and apparatus are disclosed to generate and/or receive ultra-wide bandwidth (UWB) pulses using a digital clock.

13 Claims, 7 Drawing Sheets

METHOD AND APPARATUS TO GENERATE A CLOCK-BASED TRANSMISSION

BACKGROUND OF THE INVENTION

Ultra Wideband (UWB) systems transmit signals across a much wider frequency range than conventional systems. The bandwidth of the UWB signal may be equal to at least 20% of the center frequency or more than 500 MHz. UWB transmission operates by transmitting and receiving extremely short duration bursts of radio frequency (RF) energy. Each pulse is extremely short in duration, e.g., 0.1 to 4 nanoseconds (ns).

Devices known in the art for generating UWB transmission use diode-based pulse generators, typically including a step-recovery diode or a microwave-tunnel diode, which are triggered by a clock. In such configurations, although the diodes may have good switching or pulse-generation characteristics and can be tuned to cover a wide bandwidth, they are difficult to integrate, particularly in complementary metal oxide semiconductor (CMOS) devices.

Other UWB transmission devices known in the art, which may be used in high-power UWB radar transmitters, are based on pulsed-power technology, e.g., capacitive discharge circuits, transformer switches and transmission line switches, and/or light-activated semiconductor switches. These devices are generally expensive and difficult to integrate with CMOS. In addition, the high power limits for UWB radar transmission make this type of device unsuitable for use in commercial communication systems, for example, because of limits set by the Federal Communications Commission (FCC).

Another type of transmitter known in the art is based on a gated oscillator. In this approach, in which a local oscillator is gated, the center frequency of the spectrum can be controlled by the oscillator frequency; however, the gated oscillator approach is not flexible. For example, the center frequency cannot be digitally derived, the generation of multiple tones requires multiple phase-locked loops (PLL), and the PLL implementation may consume a significant amount of power, as it cannot be turned off between pulses to maintain loop stability.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn accurately or to scale. For example, the dimensions of some of the elements may be exaggerated relative to other elements for clarity or several physical components included in one functional block or element. Further, where considered appropriate, reference numerals may be repeated among the figures to indicate corresponding or analogous elements. Moreover, some of the blocks depicted in the figures may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Embodiments of the invention provide a method and apparatus for generating ultra-wide bandwidth (UWB) pulses using a digital clock in conjunction, for example, with a UWB transmitter and/or receiver. For example, in some embodiments of the present invention, the implementation of transmitters and transmission methods may be based on digital processing. These implementations may be integrated into existing devices using complementary metal oxide semiconductor (CMOS) processes. Moreover, although the scope of the present invention is not limited in this respect, some embodiments of the present invention may be configured to operate within the boundaries set by the Federal Communications Commission (FCC) or any other regulatory body. In addition, embodiments of the present invention may use a digitally derived center transmission frequency.

The invention is described below in the context of a wireless personal area networking (WPAN) communication system. However, it will be apparent to persons skilled in the art that the invention may also be suitable for any other system or device that can drive a digital clock.

An embodiment of the present invention includes an implementation of an UWB transmitter, wherein a digital clock is used as a basis for transmission. The use of a digital clock, as opposed to the prior art use of analog elements, may significantly simplify complementary metal oxide semiconductor (CMOS) integration of the transmitter circuit, for example, because the digital clock may be generated in a straightforward manner using a digital phase locked loop (PLL). Moreover, the same circuit may be used at the receiver end of the communication system with substantially the same reduction in complexity and ease of integration enabled by the transmitter of some embodiments of the invention. For example, in a correlator-based receiver, which may be the receiver of choice in the case of an additive white Gaussian noise environment, the clock based generator according to embodiments of the invention may form part of the circuit performing "template-matching" to the original pulse, reducing receiver costs.

Figure 1:
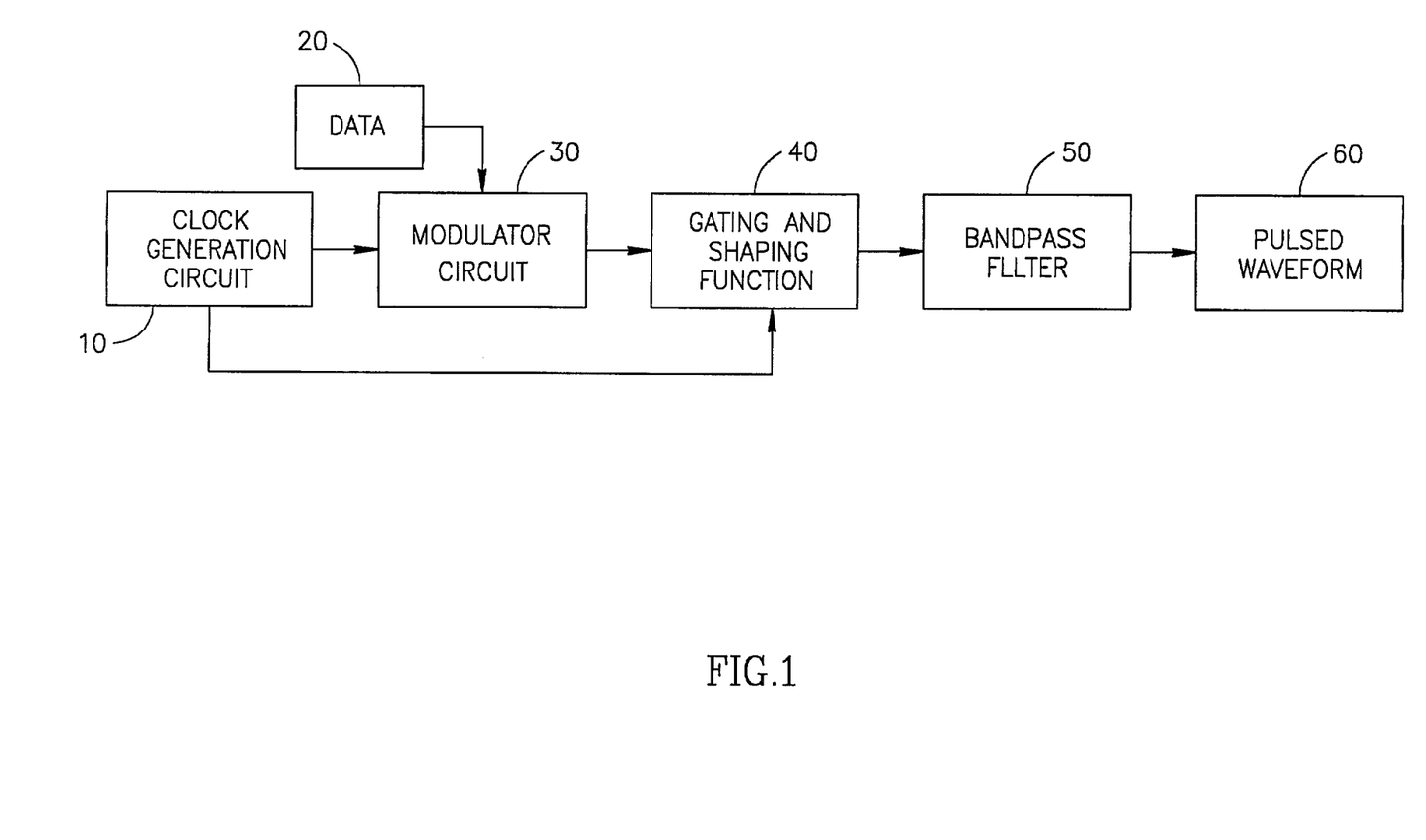
FIG. 1 is a simplified block diagram of a transmitter using a gated clock pulse generation circuit as a basis to modulate data in a UWB communications system according to exemplary embodiments of the present invention.

The block diagram of FIG. 1 provides a general description of how a gated clock pulse generation circuit may be used to modulate data in a UWB communications system according to embodiments of the present invention. A clock signal may be generated by a clock generation circuit 10. Modulator 30 may combine clock signal produced by clock generation circuit 10 with data 20. The resulting waveform may be gated and shaped by a gating and shaping unit 40, and filtered through a bandpass filter 50, ultimately resulting in a transmission signal 60 having a desired pulsed waveform. It should be noted that, in alternate embodiments of the invention, at least some of the blocks shown in FIG. 1 may be combined into a single circuit, for example, functions of clock generation circuit 10 and modulator circuit 30 may be integrated into a single circuit, or any other integration and/or disintegration of functions of the different blocks shown in FIG. 1 may be performed, in accordance with specific design considerations.

Figure 2A:
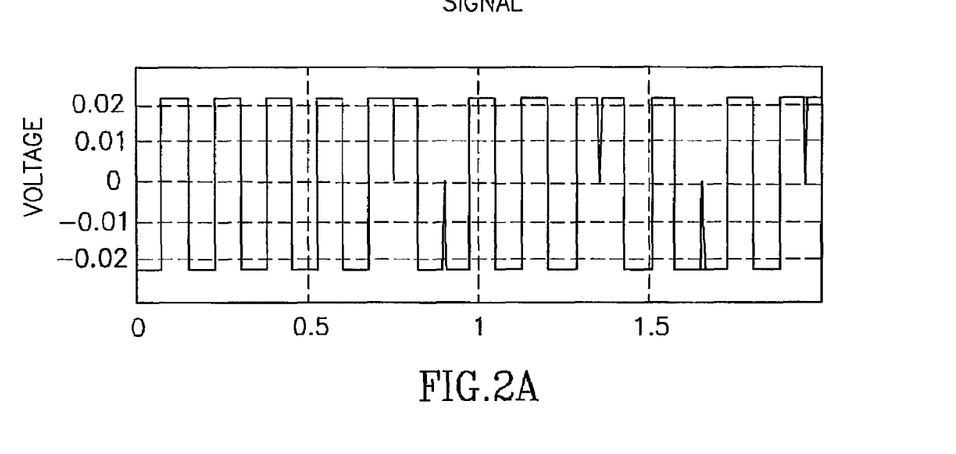
FIG. 2A is a schematic diagram illustrating unmasked bipolar modulated pulses according to exemplary embodiments of the invention.

In one embodiment of the invention, the digital clock signal may be generated by a digital phase lock loop (PLL), as is known in the art. The clock signal may then be modulated, in which case a rational number of periods of the clock signal may form the signal waveform. For example, as shown in FIG. 2A, for bipolar modulation, the waveform may include a certain pattern to represent '1' in the data and an inverted pattern to represent '0'.

Figure 2B:
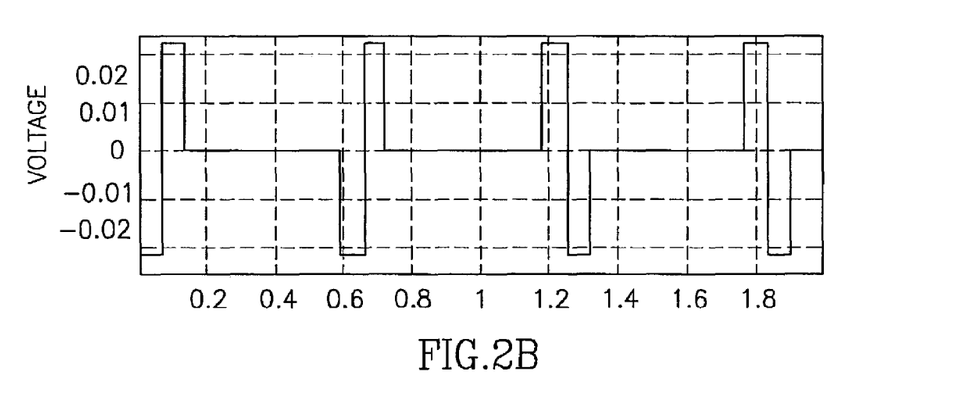
FIG. 2B is a schematic diagram of mask including low duty-cycle bipolar modulated pulses transmitter according to exemplary embodiments of the present invention.

The shape of the signal waveform may be controlled by gating the clock with a periodic switch, so that a rational number of periods of the clock may form a pulse. The gating of the clock may be controlled using simple digital logic, including AND and OR circuits, making the gating mechanism efficient to operate at high speeds and easy to integrate into CMOS. This may lower the duty cycle of the signal waveform and may enable some or all the advantages of a pulse-based UWB system, including a lower fading margin and lower inter-symbol interference. A possible increase in the peak-to-average power ratio (PAR) of the signal, due to such gating, may be controlled by using a sufficiently high duty cycle. In addition, the gating may control the spectral bandwidth of the signal, because the width of the gate varies roughly inversely with the spectral bandwidth. FIG. 2B shows bipolar modulated pulses with a low duty cycle.

Figure 2C:
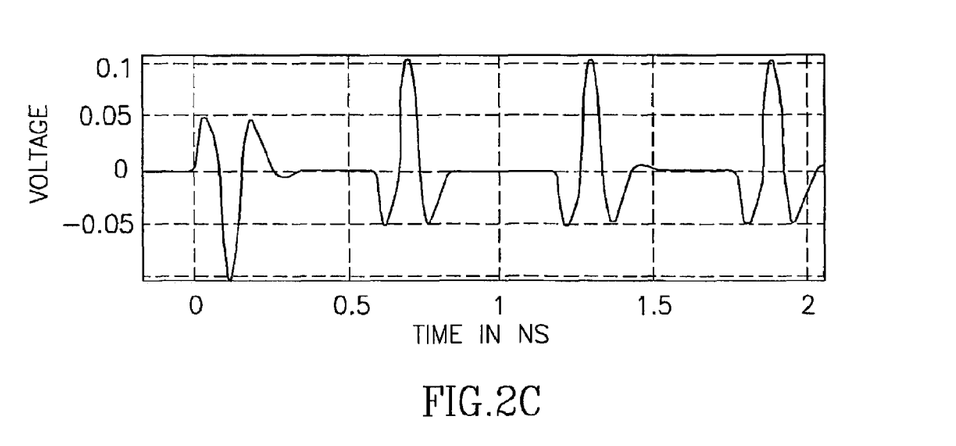
FIG. 2C is a schematic diagram of bipolar modulated pulses passing through a bandpass filter according to exemplary embodiments of the present invention.

In some exemplary embodiments of the invention, the shape of the signal waveform may be controlled by a shaping function to obtain a smoother signal envelope. Appropriate shaping of the signal may help reduce higher-order harmonics in the signal spectrum caused by the transmission of the digital clock. In some embodiments of the present invention, the digital clock may be followed by an analog band-pass filter in order to reduce higher-order harmonics and to maintain the signal within the limits of a given spectral mask, e.g., as required by Part 15 rules for unlicensed devices developed by the Federal Communications Commission (FCC). FIG. 2C shows low duty-cycle bipolar modulated pulses after applying a bandpass filter, in accordance with embodiments of the invention.

There are generally at least three design parameters that may be modified to generate a UWB waveform of particular characteristics: clock frequency ($f_c$); gating period ($T_g$); and shaping function. In embodiments of the present invention, all three characteristics may be controlled and/or varied by controlling and/or varying various clock frequencies which are used to generate the UWB waveform, as described below.

The fundamental clock frequency may determine the center frequency of the modulated waveform. In some embodiments of the present invention, the clock frequency may be a variable so that the center frequency of the modulated waveform may be altered as necessary. This provides the flexibility of easily moving the UWB waveform to a different frequency band, which may be important if UWB frequency bands differ in different transmission areas, e.g., different countries. This may also provide the flexibility of moving to unoccupied frequency bands in a particular location to minimize interference.

The gating period may determine the bandwidth of the occupied UWB waveform (e.g., bandwidth ~1/Tg). In some embodiments of the present invention, the gating period may be a variable in order to provide further flexibility of the transmission. Having a gating period that is a multiple of the clock period enables use of the same clock to generate both the fundamental clock and gating clock; however, a gating period that is a rational multiple of the clock period may also be easily derived. Also, changing the gating period and center frequency provides a convenient mechanism for changing the occupied frequencies of the UWB waveform, allowing the system to adaptively change to accommodate different interference environments.

The shaping function, which may be implemented in conjunction with the gating function, or as a separate circuit, may provide the flexibility for spectrum shaping by smoothing the envelope of the transmitted pulse. For example, in some embodiments of the present invention, a windowed function may be used to smooth the time domain pulse and limit high-frequency components in the waveform. The windowed function may for example be a Hanning window or a single cycle of a sinusoid. This may reduce the side-lobe energy of the transmitted waveform.

In some embodiments of the present invention, a windowed function may be based on a filtered version of a gating function, which may be derived from the clock signal, as described above. This function may be useful for a sub-band implementation of the present invention where multiple UWB pulses occupy adjacent frequency channels, as shown in FIGS. 6A, 6B, 6C, 8A, and 8B.

Figure 3:
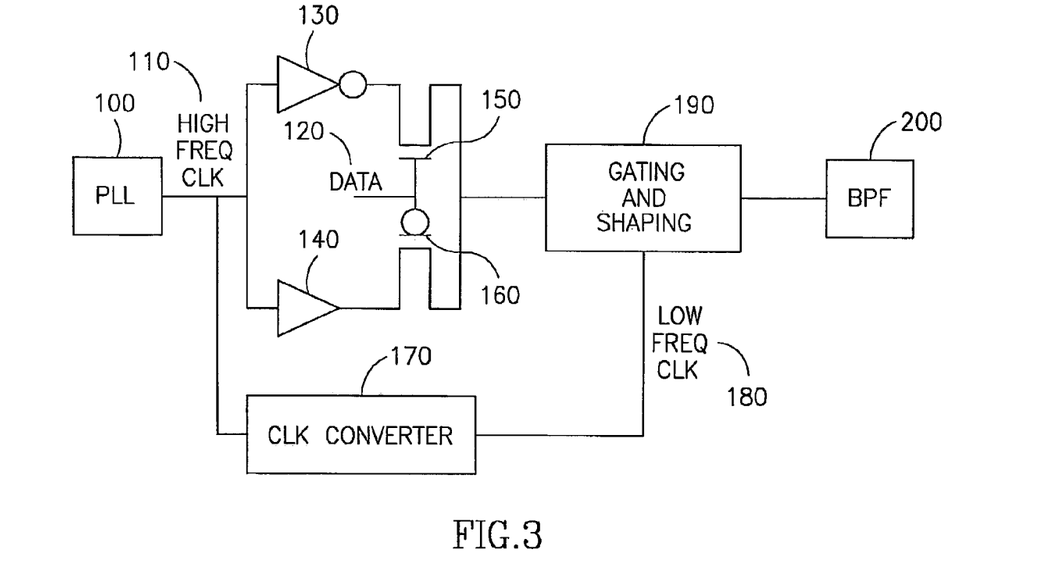
FIG. 3 is a schematic block diagram of a gated clock pulse generation circuit to modulate data in a UWB communications system according to exemplary embodiments of the present invention.

Embodiments of the present invention may be used in several types of UWB systems. One example is the pulse-based systems discussed above. Embodiments of the present invention suitable for use in such a system may involve an implementation of the clock generation scheme depicted in FIG. 3. A PLL 100 generates a high-frequency clock signal 110, which may be modulated with data 120 into a series of bipolar modulated pulses. In the embodiment shown in FIG. 3, either the pulse or the inverted pulse is chosen, depending on the data, e.g., '0' or '1', using digital inverter and buffer elements 130 and 140, respectively, and AND and NAND gate elements 150 and 160, respectively. The resulting waveform is then gated and shaped. A gating and shaping unit 190 may include a low-frequency version of a low frequency clock 180 which may gate, via clock converter 170, a predetermined multiple of the period of the high frequency clock 110. For example, the high-frequency clock 110 may run at 7 GHz, while the low-frequency clock 180 may run at 3.5 GHz. In this example, every two periods of the high-frequency clock forms a single pulse. The gating and shaping unit 190 may establish the bandwidth of the emitted UWB signal by controlling the rise time of the pulses. The gated pulses may be passed through an optional bandpass filter 200, for example, if needed to meet out of band emission requirements.

Figure 4:
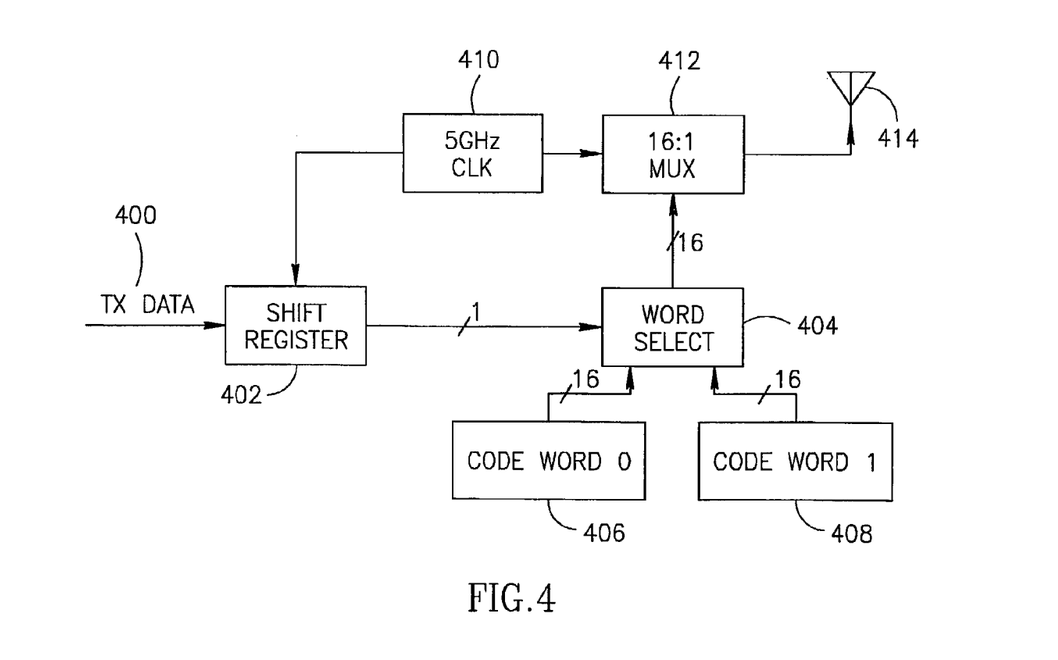
FIG. 4 is a schematic block diagram of a direct-sequence spread spectrum (DSSS) UWB transmitter implementation according to exemplary embodiments of the present invention.
Figure 5:
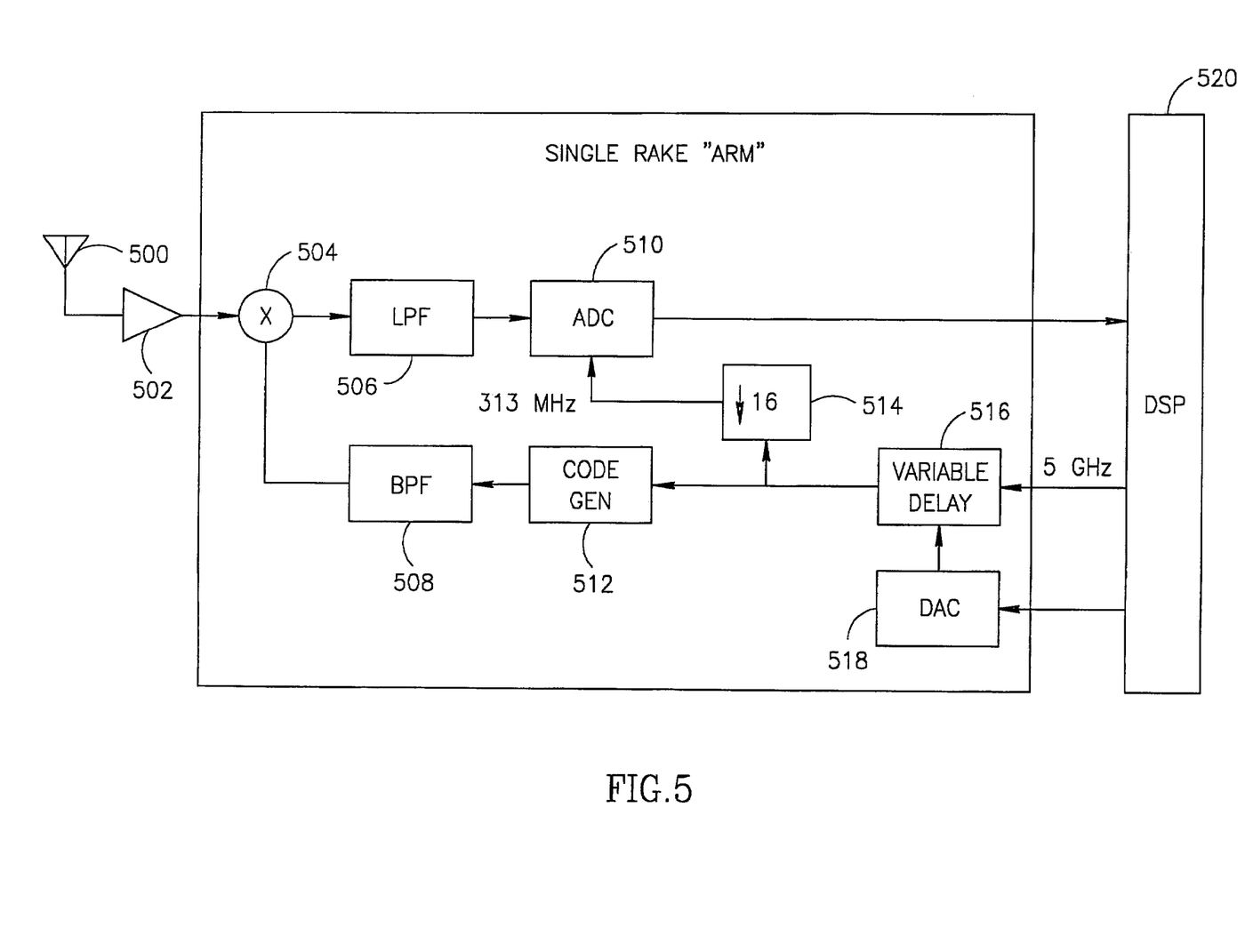
FIG. 5 is a schematic block diagram of a DSSS UWB receiver implementation according to exemplary embodiments of the present invention.

Other embodiments of the present invention may be implemented in conjunction with a direct-sequence spread spectrum (DSSS) UWB system, as depicted in FIGS. 4 and 5. This embodiment may use high-speed digital clocks to generate chip sequences to form direct sequence information symbols at rates on the order of, for example, 3 to 5 GHz. In some embodiments, code-word length and chip rates may be varied or transmitted in parallel to produce information transfer rates of 500 megabits per second (Mbps) or higher. Codes may be produced, for example, by associating a '0' with a certain sequence of encoded pulses and a '1' with a different sequence of encoded pulses. For example, each bit may be represented by a series of 15 pulses, wherein the phase of each pulse may be either inverted or not inverted. Different bits may be represented by a different sequence of 15 pulses, referred to herein as a code. Different users may also use different sets of codes, for example, to allow multiple users to transmit on the same frequency simultaneously without causing significant interference to each other.

FIG. 4 shows an embodiment of the present invention that may yield a data transmission rate of, for example, 313 Mbps. In the exemplary embodiment shown, data to be transmitted 400 is input into a 1-bit shift register 402. Although the scope of the invention is in no way limited in this regard, a 16-bit code word, e.g., "code word 0" (block 406) or "code word 1" (block 408) may be selected by a word selector 404 depending on the data symbol output by the shift register 402. The selected code word may be received by a multiplexer (Mux) 412, for example, a sixteen-to-one multiplexer (shift register) 412 operated by a 5 GHz clock 410, thereby resulting in a 5 GHz processing rate of transmitter 414. Thus, if 16 bits are transmitted at a frequency of 5 GHz, the information transmission rate is 313 Mbps. Those skilled in the art will recognize that other transmission rates are possible and that the center frequency of the RF emission may be thus controlled.

FIG. 5 depicts an embodiment of a DSSS UWB receiver. Antenna 500, which may be a dipole antenna or another type of antenna, may receive the UWB signal and may amplify it via amplifier 502. Multiplier or input mixer 504 multiplies a signal incoming via amplifier 502 with a template signal, which may be generated by a code generator 512 and passed through a bandpass filter 508. The output signal of the multiplier 504 may be filtered through a lowpass filter 506 to remove higher order harmonics. When time synchronized, this signal may recover the original transmitted information. A decimator or divider 514 may optionally be used to clock an analog-to-digital converter (ADC) 510 at the symbol rate rather than at the chip rate, which may be substantially higher. Variable digital delay circuitry 516 may be used to search and match the timing of the receiver to that of the transmitter. The DAC 518 may control the amount of delay. Code generator 512 and bandpass filter 508 may be used to form a template generator for correlation with the incoming signal. A clock source, for example, having frequency 5 GHz may be used to drive code generator 512. The code generator 512 may produce a template signal that may be correlated with a received waveform at multiplier or input mixer 504. Variable digital delay circuitry 516 may be used to search for and match the timing of the received signal, after which the signal may be digitized by ADC 510, e.g., for DSSS processing such as, for-example, channel equalization and symbol detection, as is known in the art. The digital signal output from the ADC may be provided to a digital signal processor 520 for processing.

Yet another embodiment of the present invention may be implemented in conjunction with a sub-band UWB system (SB-UWB), also known as Orthogonal Frequency and Time Division Multiplexed (OF/TDM) or pulsed orthogonal frequency-division multiplexing (OFDM). FIGS. 6A, 6B, 6C, 7, 8A and 8B show examples of sub-band waveforms that may be used in conjunction with embodiments of the invention. In these embodiments, the spectrum is divided into a number of sub-bands which, for example, may occupy a bandwidth on the order of 500 MHz. By concatenating several, for example, six or eight, sub-band waveforms, an ultra-wideband waveform occupying, e.g., approximately 4 GHz of spectrum, may be generated. The sub-band waveforms may, for example, be transmitted simultaneously, or they may, for example, be interleaved in time and transmitted in non-overlapping time intervals, or they may, for example, be transmitted during partially overlapping intervals. Some or all, or none, of the sub-band waveforms may have the same bandwidth. The center frequency of the sub-band waveforms and the bandwidth of the waveforms may be controlled, for example, using a gated clock circuit, e.g., as described above.

Figure 6A:
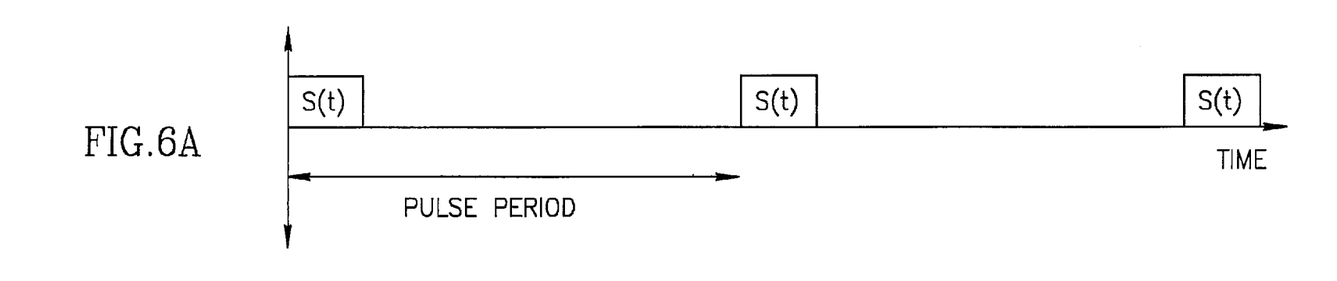
FIG. 6A is a schematic time domain representation of a pulsed orthogonal frequency-division multiplexing (OFDM) waveform based on simultaneous transmission of multiple carriers, according to exemplary embodiments of the present invention.
Figure 6B:
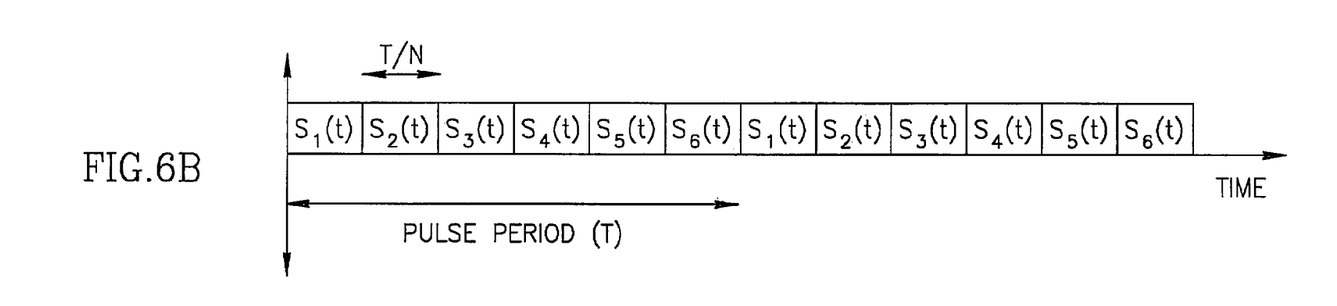
FIG. 6B is a schematic time domain representation of a pulsed orthogonal frequency and time division multiplexed (OF/TDM) waveform based on transmission of non-overlapping, or partially overlapping, pulsed waveforms, according to exemplary embodiments of the present invention.
Figure 6C:
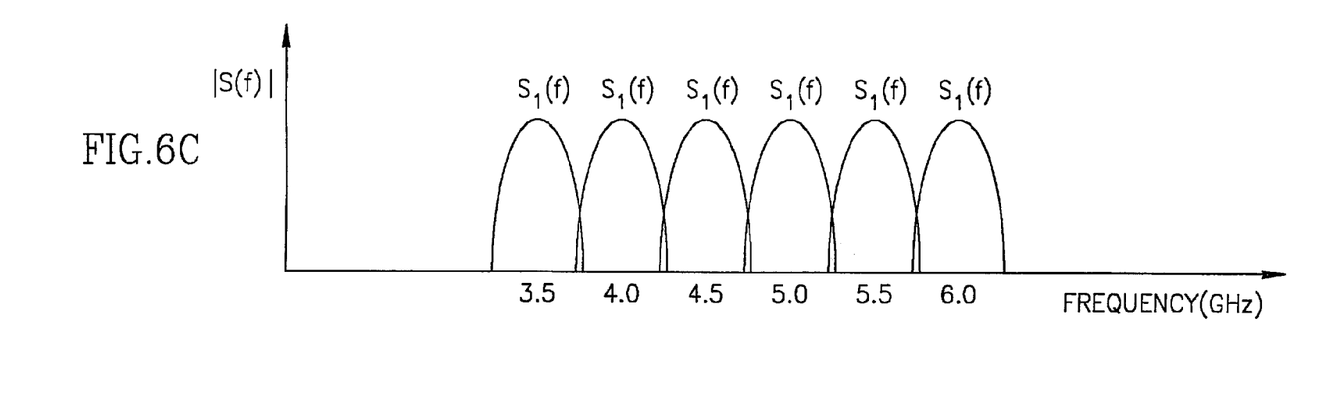
FIG. 6C is a schematic frequency domain representation of a pulsed OFDM or OF/TDM ultra-wideband waveform including a concatenation of multiple sub-bands, according to exemplary embodiments of the present invention.

The schematic diagrams of FIGS. 6A, 6B and 6C show time and/or frequency domain representations of an exemplary sub-band implementation of embodiments of the invention. FIG. 6A shows a time domain representation of a pulsed OFDM waveform based on simultaneous transmission of multiple carriers, that may be implemented using gated clock circuits according to exemplary embodiments of the present invention. In the example shown in FIG. 6A, a concatenated OFDM waveform s(t) is transmitted during a portion of the pulse period, depending on the duty cycle.

FIG. 6B shows a time domain representation of a pulsed OF/TDM waveform, i.e., sub-banded or multi-banded waveform, based on the transmission of non-overlapping, or partially overlapping, pulsed waveforms, which waveform may be implemented using gated clock circuits according to exemplary embodiments of the present invention. In the example shown in FIG. 6B, the six sub-band waveforms s1(t) to s6(t) are transmitted during alternating portions of the pulse period, substantially filling the period. In the example shown, each sub-band waveform fills a fraction of the pulse period, e.g., one sixth in FIG. 6B, depending on the number of sub-band waveforms transmitted.

FIG. 6C shows a frequency domain representation of a pulsed OFDM or OF/TDM waveform on the order of several GHz including a concatenation of multiple sub-bands, that may be implemented using gated clock circuits according to exemplary embodiments of the present invention. In the example shown, six sub-bands may be transmitted at center frequencies 500 MHz apart, where some or all have bandwidth 500 MHz.

Figure 7:
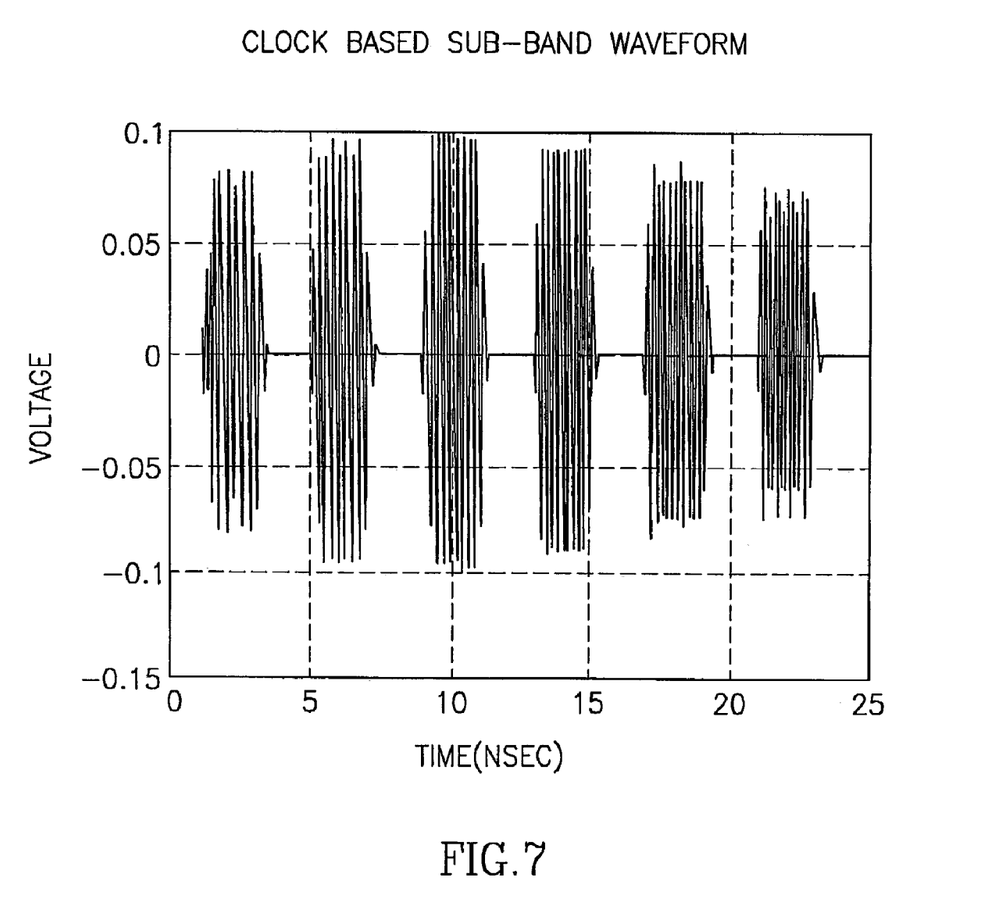
FIG. 7 is a schematic time domain representation of an OF/TDM transmitted waveform, including interleaved sub-band pulses, each occupying a different frequency band, according to exemplary embodiments of the present invention.

In another example, depicted in FIG. 7, six SB-UWB waveforms may be generated using clock frequencies varying between 3.5 and 6 GHz, which may be gated with a period of 2 nanoseconds (ns), resulting in bandwidths on the order of approximately 500 MHz. FIG. 7 shows these sub-band waveforms transmitted during non-overlapping periods. Such non-overlapping transmission may have the advantages of reducing the peak-to-average power ratio (PAR) of the signal and enabling alternate implementations, e.g., implementations where sub-bands may be generated sequentially, e.g., only one at a time.

Figure 8A:
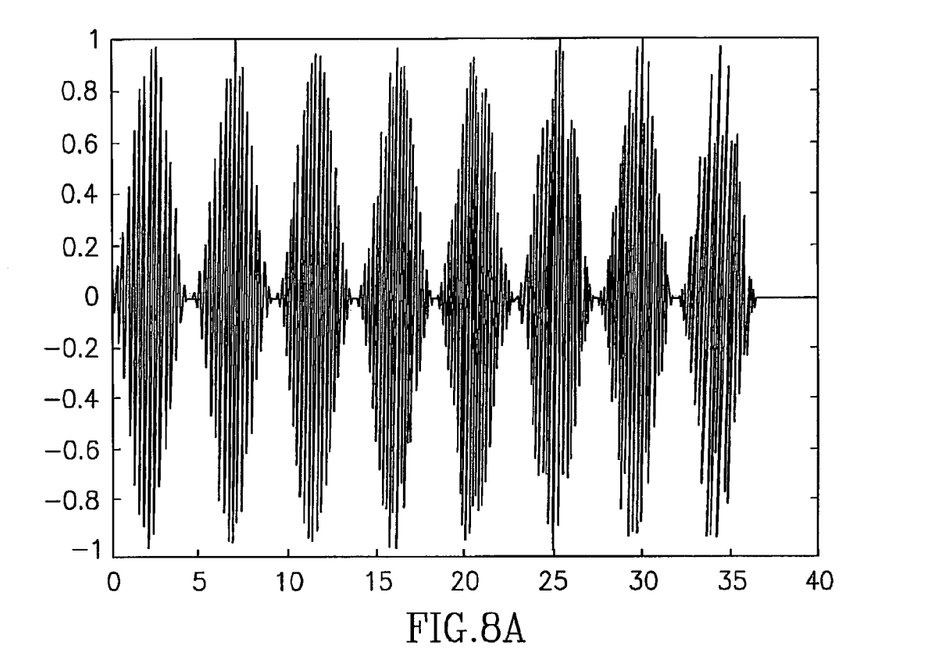
FIG. 8A schematically illustrates a time-domain representation of a Hanning-shaped sub-band waveform using an embodiment of an OF/TDM system in accordance with exemplary embodiments of the present invention.

In the embodiment shown in FIG. 7, sub-bands may be modulated by different data bits, resulting in a potentially very high throughput. Also, the coverage of sub-bands may be changed within the UWB frequency domain by changing the clock frequency used to generate the sub-band waveform. For example, if such a SB-UWB system is implemented in conjunction with an IEEE 802.11a wireless local-area-network (WLAN) device that operates in the 5.15-5.35 GHz frequency band, a sub-band overlaying the 5.15-5.35 GHz band may be adjusted to a higher frequency by changing the clock frequency. (See Institute of Electrical and Electronics Engineers (IEEE) Standard 802.11a-1999, "Wireless LAN Medium Access Control (MAC) and Physical Layer (PHY) Specification: High-speed Physical Layer in the 5 GHz Band"). FIGS. 7 and 8A show an exemplary time domain representation of the transmitted waveforms, where the sub-band pulses are interleaved in time.

Figure 8B:
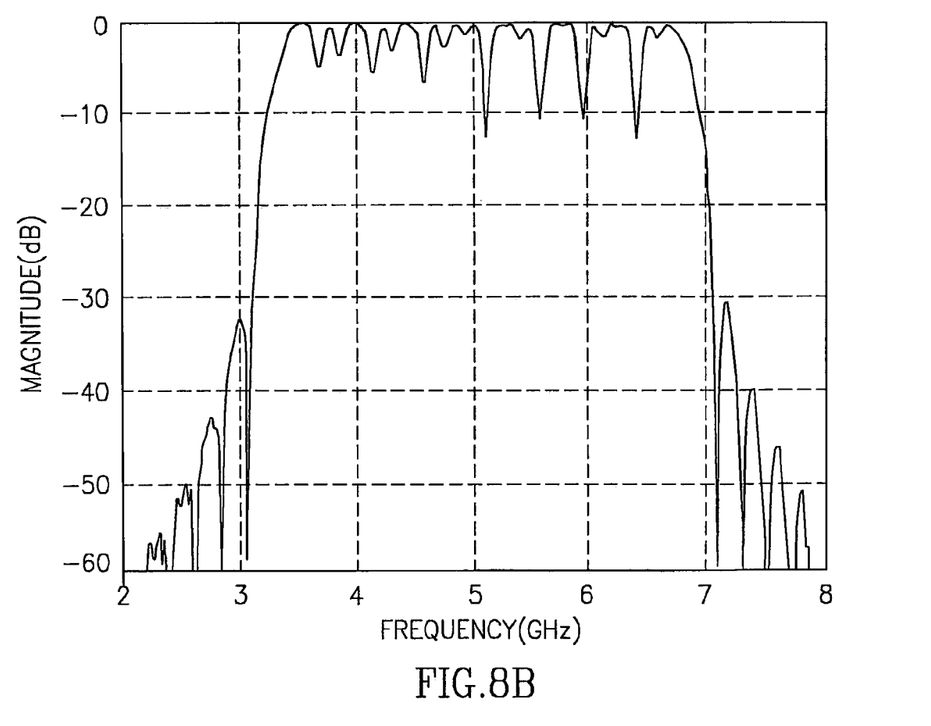
FIG. 8B is a schematic frequency-domain representation of a shaped sub-band OF/TDM waveform in accordance with exemplary embodiments the present invention.

In these examples, the UWB sub-bands may be generated using digital clocks, as described previously, with the output filtered through, for example, a 3.0-6.5 GHz Bessel bandpass filter (FIG. 7) and shaped using a Hanning window (FIG. 8A). FIG. 8A shows an example of the time-domain representation of a shaped sub-band waveform having a Hanning shape and using an embodiment of an OF/TDM system in accordance with embodiments of the present invention. FIG. 8B shows a frequency-domain representation of a shaped sub-band OF/TDM waveform in accordance with embodiments of the present invention. Those of ordinary skill in the art will recognize that there are various methods to generate the multiple clock frequencies, as may be used in this embodiment of the invention, including multiple analog PLLs, digital PLLs, or multiple phases of a single PLL, or any other suitable method.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method comprising:
accepting a digitally produced clock signal and data; and
deriving a direct sequence ultrawide bandwidth signal from the digitally produced clock signal and data, wherein deriving the ultrawide bandwidth signal comprises:
digitally producing the clock signal;
modulating the clock signal with the data to obtain a modulated signal, wherein modulating the clock signal with data comprises inverting the clock signal to obtain an inverted clock signal and modulating the inverted clock signal with the data using an AND gate; and
shaping the modulated signal to obtain the ultrawide bandwidth signal.

2. The method of claim 1, wherein deriving the ultrawide bandwidth signal comprises
gating the modulated signal to obtain the ultrawide bandwidth signal.

3. The method as in claim 1, wherein shaping the modulated signal comprises filtering the modulated signal.

4. The method as in claim 1, wherein shaping the modulated signal comprises windowing the clock signal with a function of the modulated signal.

5. A method comprising:
receiving a digitally produced clock signal and data;
deriving a direct sequence ultrawide bandwidth signal from the digitally produced clock signal and data, wherein deriving the ultrawide bandwidth signal comprises:
digitally producing the clock signal;
modulating the clock signal with the data to obtain a modulated signal, wherein modulating the clock signal with data comprises buffering the clock signal to obtain a buffered clock signal and modulating the buffered clock signal with the data using a NAND gate; and
shaping modulated signal to obtain the ultrawide bandwidth signal.

6. The method of claim 5, wherein deriving the ultrawide bandwidth signal comprises gating the modulated signal to obtain the ultrawide bandwidth signal.

7. The method of claim 5, wherein shaping the modulated signal comprises filtering the modulated signal.

8. The method of claim 5, wherein shaping the modulated signal comprises windowing the clock signal with a function of the modulated signal.

9. An apparatus comprising:
a digital clock to produce a digital clock signal;
a modulator to modulate the clock signal with data to produce a modulated signal, wherein modulating the clock signal with data comprises inverting the clock signal to obtain an inverted clock signal and modulating the inverted clock signal with the data using an AND gate; and
a shaping unit to shape the modulated signal, wherein the apparatus is adapted for deriving a direct sequence ultrawide bandwidth signal from the digitally produced clock signal and the data.

10. An apparatus as in claim 9 further comprising a bandpass filter to reduce higher-order harmonics in the modulated signal.

11. A system comprising:

a digital clock to produce a digital clock signal;

a modulator to modulate the clock signal with data, thereby to produce a modulated signal, wherein modulating the clock signal with data comprises inverting the clock signal to obtain an inverted clock signal and modulating the inverted clock signal with the data using an AND gate;

a shaping unit to shape the modulated signal; and a dipole antenna to transmit the modulated signal, wherein the system is adapted for deriving a direct sequence ultrawide bandwidth signal from the digitally produced clock signal and the data.

12. The system of claim 11 further comprising a bandpass filter to reduce higher-order harmonics in the modulated signal.

13. The system of claim 12, wherein the bandpass filter is a Bessel bandpass filter.

* * * * *